(12) United States Patent
Wiegele et al.

(10) Patent No.: US 12,145,741 B2
(45) Date of Patent: Nov. 19, 2024

(54) ONBOARD EQUIPMENT DATA SYNCHRONIZATION SYSTEM

(71) Applicant: ARINC Incorporated, Annapolis, MD (US)

(72) Inventors: Thomas G. Wiegele, Eagan, MN (US); Michael J. Haukom, Farmington, MN (US)

(73) Assignee: ARINC Incorporated, Annapolis, MD (US)

( * ) Notice: Subject to any disclaimer, the term of this patent is extended or adjusted under 35 U.S.C. 154(b) by 444 days.

(21) Appl. No.: 17/829,758

(22) Filed: Jun. 1, 2022

(65) Prior Publication Data

US 2023/0391470 A1    Dec. 7, 2023

(51) Int. Cl.
*G07C 5/08*    (2006.01)
*B64D 43/00*    (2006.01)

(52) U.S. Cl.
CPC ........... *B64D 43/00* (2013.01); *G07C 5/0816* (2013.01); *G07C 5/085* (2013.01)

(58) Field of Classification Search
CPC ....... B64D 43/00; G07C 5/0816; G07C 5/085
See application file for complete search history.

(56) References Cited

U.S. PATENT DOCUMENTS

| | | | |
|---|---|---|---|
| 10,911,135 B2 | 2/2021 | Ramsey et al. | |
| 2013/0197739 A1 | 8/2013 | Gallagher et al. | |
| 2019/0112075 A1 | 4/2019 | Kalmar et al. | |
| 2019/0228599 A1 | 7/2019 | Hrib et al. | |
| 2020/0204464 A1 | 6/2020 | Watson et al. | |
| 2020/0362766 A1 | 11/2020 | Lamberti et al. | |
| 2021/0311522 A1 | 10/2021 | Vlacich et al. | |

FOREIGN PATENT DOCUMENTS

| | | |
|---|---|---|
| EP | 2737795 A1 | 6/2014 |
| EP | 2729868 B1 | 10/2018 |

OTHER PUBLICATIONS

Extended European Search Report dated Oct. 20, 2023; European Application No. 23175765.9.

*Primary Examiner* — Mathew Franklin Gordon

(74) *Attorney, Agent, or Firm* — Suiter Swantz IP

(57) ABSTRACT

An onboard system in an aircraft records data simultaneously from a plurality of onboard products, systems, and devices. The data is recorded in response to an event trigger common to each onboard product, system, and device, and tagged with a common timestamp and stored in a centralized data store. The system compiles the data into a single dataset, synchronizing the data according to the common timestamp. The data may be modified to reflect the common timestamp where the data includes a different timecode from the original source. The data may also be modified to conform to a standard format. The dataset may be encrypted according to a standard and transmitted offboard for later analysis, or analyzed onboard if immediate analysis is required.

20 Claims, 4 Drawing Sheets

ONBOARD EQUIPMENT DATA SYNCHRONIZATION SYSTEM

BACKGROUND

Existing onboard avionics systems generate and record data in-flight. That data is generally only available offline, in separate discrete repositories. Meanwhile, the avionics systems may, at times, interact with each other in an adverse way. There is currently no mechanism for collecting synchronized data from all onboard avionics systems to determine if systems are adversely interacting with each other in real-time. Furthermore, getting the data, even not in real-time, is complex, time consuming, expensive, and error prone, especially when human intervention is required.

It would be advantageous to have a quick, easy, cheap, and accurate mechanism to gather synchronized system data, store it locally, and transmit it in a secure and timely fashion.

SUMMARY

In one aspect, embodiments of the inventive concepts disclosed herein are directed to an onboard system in an aircraft to record data from a plurality of onboard products, systems, and devices. The data is recorded in response to an event trigger common to each onboard product, system, and device, and tagged with a common timestamp and stored in a centralized data store.

In a further aspect, the system compiles the data from multiple localized data stores into a single dataset, synchronizing the data according to the common timestamp. The data may be modified to reflect the common timestamp where the data includes a different timecode from the original source. The data may also be modified to conform to a standard format.

In a further aspect, the dataset may be encrypted according to a standard and transmitted offboard for later analysis.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
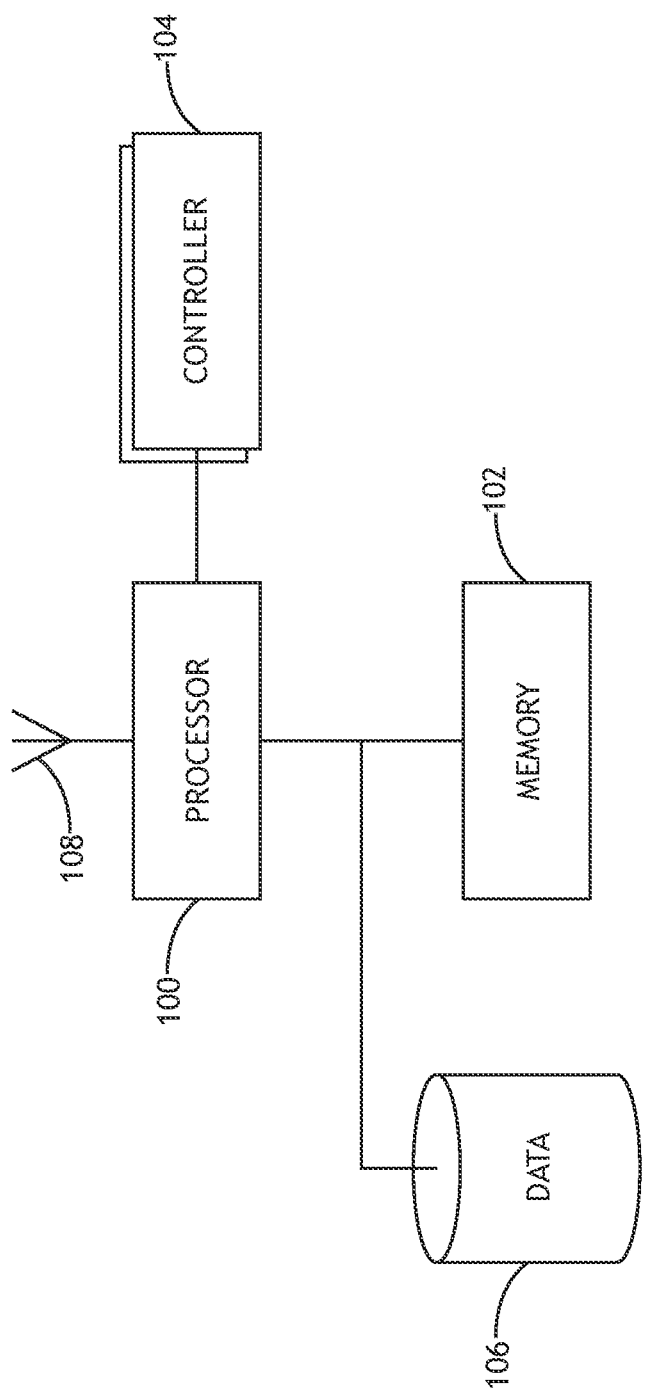
FIG. 1 shows a block diagram of a system suitable for implementing exemplary embodiments.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an onboard system in an aircraft to record data from a plurality of onboard products, systems, and devices. The data is recorded in response to an event trigger common to each onboard product, system, and device, and tagged with a common timestamp and stored in a centralized data store. The system compiles the data into a single dataset, synchronizing the data according to the common timestamp. The data may be modified to reflect the common timestamp where the data includes a different timecode from the original source. The data may also be modified to conform to a standard format. The dataset may be encrypted according to a standard and transmitted offboard for later analysis.

Referring to FIG. 1, a block diagram of a system suitable for implementing exemplary embodiments is shown. The system includes a processor 100, memory 102 connected to the processor 100 for storing processor executable code, and a data storage element 106 for storing compiled datasets as more fully described herein. The processor 100 is in data communication with a plurality of controllers 104, such as via an onboard communication bus, ethernet connection, wireless connection, etc.; each controller 104 associated with a product, system or device. Each controller 104 is configured to query the associated product, system or device and produce an equipment status record in real-time.

The processor 100 is configured to identify one or more trigger events. When a trigger event is identified, the processor 100 queries each controller 104 for an equipment status record, or instructs each controller 104 to produce an equipment status record. The processor 100 then receives each equipment status record and compiles the information into a single dataset.

In at least one embodiment, the processor 100 extracts data from each equipment status record and reformats the data into a single, cohesive dataset/database. Alternatively, or in addition, the cohesive dataset/database may comprise a distributed database wherein data is stored across different physical locations on a network, or otherwise in data communication. Such reformatting may include adjusting a timecode to coincide with the event trigger, converting units, and such.

In at least one embodiment, the system may include a wireless communication element 108 in data communication with the processor 100. The processor 100 may communicate with some or all of the controllers 104 via the wireless communication element 108. Furthermore, the compiled dataset may be transmitted to a ground-based receiver via the wireless communication element 108. The wireless communication element 108 may include cellular hardware, SatCom, WiFi, etc.

In at least one embodiment, the processor 100 may be configured to correlate system faults based on the compiled equipment status records. Multiple may be correlated in real-time and communicated to flight or ground crew for diagnosis and correction.

Figure 2:
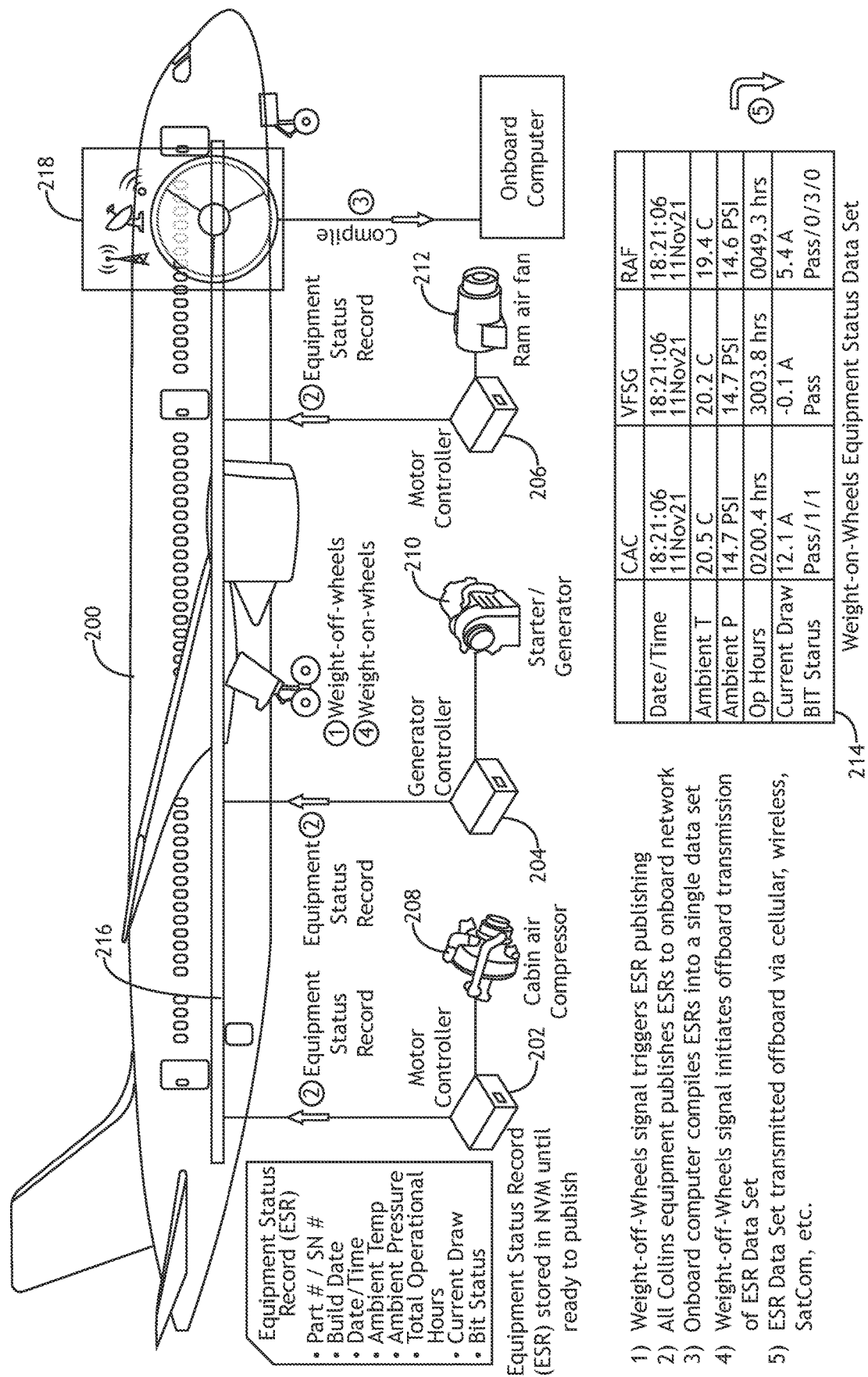
FIG. 2 shows a block diagram of a system according to an exemplary embodiment.

Referring to FIG. 2, a block diagram of a system according to an exemplary embodiment is shown. An aircraft 200 having a plurality of controllers 202, 204, 206, each associated with a product, system or device 208, 210, 212, includes a onboard computer system 218 (such as in FIG. 1, implemented as a single device or a distributed system) in data communication with the controllers 202, 204, 206 via an onboard bus 216. During one or more triggering events, the onboard computer system 218 may, request, or otherwise receive an equipment status record from each controller 202, 204, 206. In at least one embodiment, each equipment status record may be modified to include identifying information specific to the system or device 208, 210, 212.

The onboard computer system 218 compiles the equipment status records into a single dataset. In at least one embodiment, the onboard computer system 218 may extract each data element from each equipment status record, and populate a unified database 214 with the data elements. Alternatively, or in addition, the equipment status records may be stored as separate records in a database 214.

In at least one embodiment, the onboard computer system 218 may include stored sets of device limitation metrics. As each equipment status record is received and compiled, the onboard computer system 218 may compare each data point to a corresponding stored device limitation metric. The onboard computer system 218 may then report any systems or devices 208, 210, 212 outside those limitations.

Figure 3:
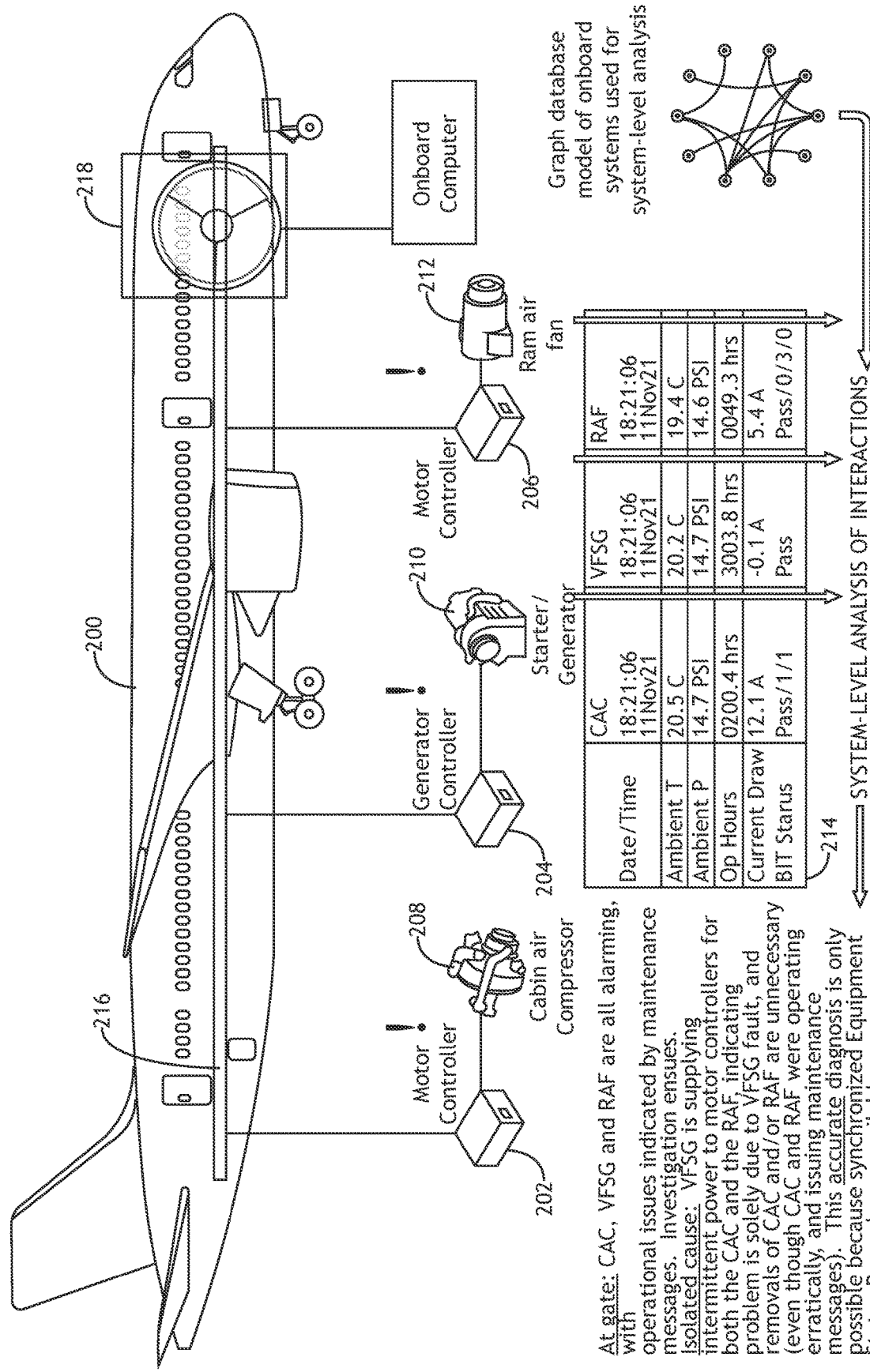
FIG. 3 shows a block diagram of a system according to an exemplary embodiment.

Referring to FIG. 3, a block diagram of a system according to an exemplary embodiment is shown. An aircraft 200 having a plurality of controllers 202, 204, 206, each associated with a product, system or device 208, 210, 212, includes a onboard computer system 218 in data communication with the controllers 202, 204, 206 via an onboard bus 216. During one or more triggering events, the onboard computer system 218 receives an equipment status record from each controller 202, 204, 206. The data from each equipment status record is compiled into a unified database 214

In at least one embodiment, multiple equipment status records may report operational issues in one or more maintenance messages. In one example, a cabin air compressor 208, starter/generator 210, and ram air fan 212 all report faults. Because the onboard computer system 218 compiles equipment status records at the same time based on a trigger event, the onboard computer system 218 may correlate the faults and analyze the nature of each fault. Where the starter/generator 210 is identified as supplying intermittent power to motor controllers 202, 206, a known relation between the cabin air compressor 208 and ram air fan 212, and the starter/generator 210 may allow the onboard computer system 218 to isolate the fault to only the starter/generator 210, obviating the need to service the cabin air compressor 208 and ram air fan 212. Such accurate diagnosis is only possible because synchronized equipment status records are available.

Figure 4:
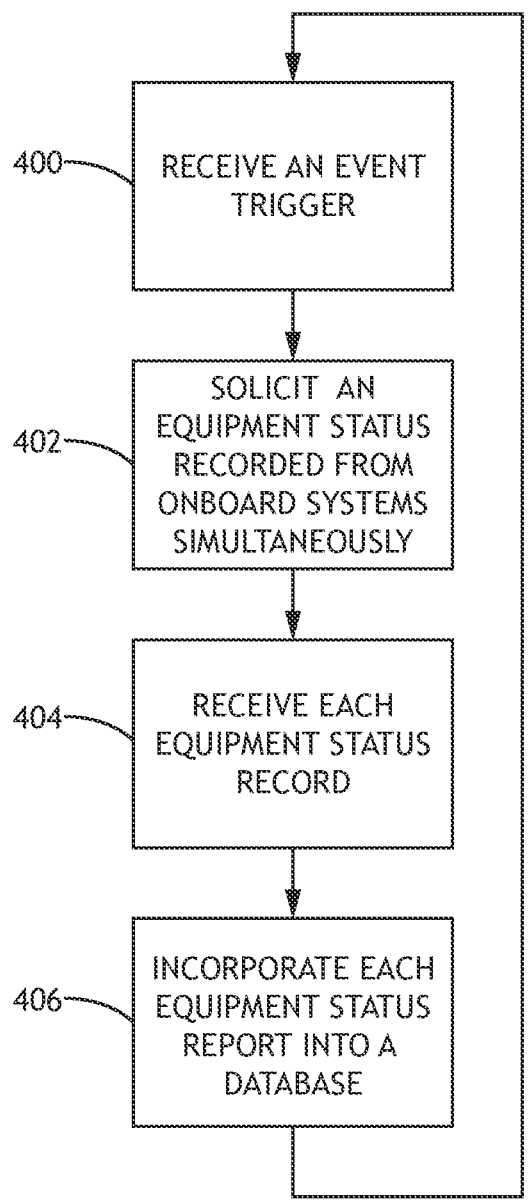
FIG. 4 shows a flowchart of a method according to an exemplary embodiment.

Referring to FIG. 4, a flowchart of a method according to an exemplary embodiment is shown. An onboard processor receives 400 an event trigger corresponding identifiable aircraft event such as "weight-off-wheels", "weight-on-wheels", "power on", "power off", "engine start-up", etc., and solicits 402 an equipment status record from each of a plurality of onboard systems. In response, each onboard system publishes an equipment status record to an aircraft data bus. Because the solicitation is based on an even trigger, the equipment status records are synchronized. Alternatively, each system or device may continuously or periodically publish equipment status records to the aircraft data bus and the trigger event initiates the process to retrieve a current equipment status record for each onboard system or device. In at least one embodiment, event triggers may include complex triggers comprising events or exceedances that are logically combined.

In at least one embodiment, in addition to aircraft events, the event trigger may comprise a periodic digitally controlled event; for example, the processor may initiate 400 a trigger event at a rate of, for example, 1 hertz. Furthermore, the processor may communicate with the onboard systems to instruct onboard systems to adjust a corresponding publishing frequency of the equipment status records when the aircraft is in distress or some other event has occurred where an increased frequency is desired.

In at least one embodiment, the event trigger may comprise some alert message corresponding to a system fault. The fault message would then trigger a simultaneous equipment status record from each onboard system or device.

In a least one embodiment, the processor may modify the set of event triggers in real-time at the request of the flight crew or ground crew, in response to an aircraft event, in response to a weather event, etc. For example, the processor may by default operate based on a set of aircraft event triggers, but if a system fault is detected, the processor may switch to a frequency-based event triggering. Likewise, the frequency of such event triggering may be altered in real-time.

The processor receives 404 each equipment status record and incorporates 406 the equipment status records or included data into a database. In at least one embodiment, each equipment status record may include a timestamp and certain measurable metrics for the corresponding system or device including ambient temperature, pressure, operational hours, electrical current/power draw, BIT status, etc. In at least one embodiment, equipment status records may be amended to include additional identifying information such as the corresponding part number, serial number, and build date for the corresponding system or device.

In at least one embodiment, the processor continuously waits to receive 400 an event trigger to initiate receiving the equipment status records and incorporating 406 them into the database.

In at least one embodiment, the periodically updated database may be offloaded as a dataset for a more complete data analysis such as via machine learning to identify system-to-system interactions, thereby aiding in troubleshooting, root cause and corrective actions, and prognostics.

Embodiments of the present disclosure enable data synchronization with reference to trigger events such as weight-on-wheels or weight-off-wheels. Data synchronizing enables greater operational insight in real-time. Synchronized, recorded data may produce a single dataset corresponding to the entire lifecycle of components for a more holistic analysis than is currently possible. System-level insights enable the prediction of maintenance operations, thereby predicting the piece-part demand associated with those maintenance operations.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
    at least one processor in data communication with a data storage element and a memory storing processor executable code for configuring the at least one processor to:
    receive an event trigger;
    receive time synchronized equipment status records from each of a plurality of devices in data communication with the at least one processor;
    compile all of the time synchronized equipment status records into one or more databases; and
    transmit the single database to an offboard receiver.

2. The computer apparatus of claim 1, wherein the event trigger comprises one or more aircraft level events including one or more of "weight-off-wheels", "weight-on-wheels", "power on", "power off", or "engine start-up".

3. The computer apparatus of claim 1, wherein the event trigger comprises a logical combination of a plurality of aircraft level events.

4. The computer apparatus of claim 1, wherein the event trigger comprises a time periodic event.

5. The computer apparatus of claim 4, wherein the at least one processor is further configured to alter a periodicity of the time periodic event.

6. The computer apparatus of claim 4, wherein the at least one processor is further configured to switch between distinct sets of event triggers.

7. The computer apparatus of claim 5, wherein the at least one processor is further configured to:
    correlate multiple data elements outside a corresponding device limitation metric; and
    identify a single source device as the source of the one more data elements outside the device limitation metric.

8. A method comprising:
    receiving an event trigger;
    receiving time synchronized equipment status records from each of a plurality of devices in data communication with the at least one processor;
    compiling all of the time synchronized equipment status records into one or more databases; and
    transmitting the single database to an offboard receiver.

9. The method of claim 8, wherein the event trigger comprises one or more aircraft level events including one or more of "weight-off-wheels", "weight-on-wheels", "power on", "power off", or "engine start-up".

10. The method of claim 8, wherein the event trigger comprises a logical combination of a plurality of aircraft level events.

11. The method of claim 8, wherein the event trigger comprises a processor-initiated time periodic event.

12. The method of claim 11, further comprising altering a periodicity of the processor-initiated time periodic event.

13. The method of claim 11, further comprising switching between distinct sets of event triggers.

14. The method of claim 13, further comprising:
    correlating multiple data elements outside a corresponding device limitation metric; and
    identifying a single source device as the source of the one more data elements outside the device limitation metric.

15. An aircraft system comprising:
    a wireless communication element; and
    at least one processor in data communication with a data storage element and a memory storing processor executable code for configuring the at least one processor to:
    receive an event trigger;
    receive time synchronized equipment status records from each of a plurality of devices in data communication with the at least one processor;
    compile all of the time synchronized equipment status records into one or more databases; and
    transmit the single database to an offboard receiver via the wireless communication element.

16. The aircraft system of claim 15, wherein the event trigger comprises one or more aircraft level events including one or more of "weight-off-wheels", "weight-on-wheels", "power on", "power off", or "engine start-up".

17. The aircraft system of claim 15, wherein the event trigger comprises a logical combination of exceedances.

18. The aircraft system of claim 15, wherein the event trigger comprises a time periodic event.

19. The aircraft system of claim 18, wherein the at least one processor is further configured to switch between distinct sets of event triggers.

20. The aircraft system of claim 19, wherein the at least one processor is further configured to:
- correlate multiple data elements outside a corresponding device limitation metric; and
- identify a single source device as the source of the one more data elements outside the device limitation metric.

* * * * *